United States Patent [19]
Ohata et al.

[11] 3,895,221
[45] July 15, 1975

[54] MEASURING APPARATUS FOR TWO-VARIABLE FUNCTION SIGNAL SYSTEM

[75] Inventors: Shuichi Ohata; Yoji Takeuchi; Takeshi Ishiguro; Shiro Yauchi, all of Musashino, Japan

[73] Assignee: Yokogawa Electric Works, Ltd., Tokyo, Japan

[22] Filed: Sept. 19, 1973

[21] Appl. No.: 398,639

[30] Foreign Application Priority Data
Sept. 22, 1972  Japan.............................. 47-95557

[52] U.S. Cl. ........ 235/151.3; 235/151.35; 235/193; 328/145
[51] Int. Cl............................................. G06g 7/24
[58] Field of Search............ 235/151.3, 151.35, 193; 328/145

[56] References Cited
UNITED STATES PATENTS

| | | | |
|---|---|---|---|
| 2,935,687 | 5/1960 | Eschner, Jr. .......................... | 328/145 |
| 3,109,103 | 10/1963 | Wilhelmsen ......................... | 328/145 |
| 3,428,796 | 2/1969 | Martens et al.................. | 235/151.35 |
| 3,499,160 | 3/1970 | Gordon............................... | 328/145 |
| 3,600,567 | 8/1971 | Varnela .......................... | 235/151.35 |
| 3,626,166 | 12/1971 | Berg et al. ...................... | 235/151.35 |
| 3,710,089 | 1/1973 | Ohata et al ........................ | 328/145 |

FOREIGN PATENTS OR APPLICATIONS

| | | | |
|---|---|---|---|
| 519,923 | 12/1955 | Canada................................ | 328/145 |

*Primary Examiner*—Malcolm A. Morrison
*Assistant Examiner*—Errol A. Krass
*Attorney, Agent, or Firm*—Parmelee, Johnson & Bollinger

[57] ABSTRACT

A measuring apparatus for two-variable function signal system such as is used to measure sulfur concentration in variable density petroleum, characterized by a linearizing circuit for linearizing the difference between a reference input signal and an input exponential function signal having two independent variables as its exponents; a circuit for subtracting from the output signal of the linearizing circuit a signal corresponding to the product of the reference value of the desired one of the independent variables and the difference between the reference value of the other independent variable and the other independent variable; and a division circuit with its dividend input being a signal corresponding to the output of the subtraction circuit, and its divisor input being a signal corresponding to the difference between the reference value of the other independent variable and the other independent variable.

6 Claims, 3 Drawing Figures

3,895,221

MEASURING APPARATUS FOR TWO-VARIABLE FUNCTION SIGNAL SYSTEM

BACKGROUND OF THE INVENTION

1. Field of the Invention

The present invention relates to measuring apparatus for two-variable function signal systems, capable of extracting the desired independent variable from an exponential function signal having two independent variables as its exponents.

2. Description of the Prior Art

Systems for measuring an exponential function signal having two independent variables are known. An example of such a system is one measuring radioactive rays absorbed by a liquid such as petroleum containing, for example, sulfur, and thereby measuring the sulfur concentration. In such a system the sulfur concentration detection signal is an exponential function signal including two independent variables as its exponents, which stand for the sulfur concentration and the petroleum density respectively. The sulfur concentration cannot be measured accurately using such a signal unless it is compensated with respect to the petroleum density.

A known sulfur concentration meter of this type comprises a logarithmic amplifier in which the sulfur concentration detection signal is converted, linearized and compensated with respect to the density. Generally this logarithmic amplifier is of feedback type utilizing the characteristics of diodes and transistors, and is designed to be operable over a wide input range. This amplifier, however, is comparatively low in operating stability in view of its conversion output. Hence, in the prior art, it has been difficult to realize high accuracy in the measurement of sulfur concentration.

To solve this problem, another sulfur concentration meter using no logarithmic amplifier has been proposed. This concentration meter operates in a manner such that a petroleum density detection signal, converted into an exponential signal having as its exponents two variables corresponding to the density and a reference sulfur concentration, and a reference signal, converted into an exponential signal having as its exponents two variables corresponding to a reference density and the reference sulfur concentration, are subtracted from the sulfur concentration detection signal, the resultant difference signal is linearized and then is divided by a signal related to the density detection signal, whereby the sulfur concentration is measured irrespective of density. This type of concentration meter operates with fairly high accuracy, but at the sacrifice of other complications — the circuit for converting the density detection signal into an exponential signal which represents the density and the reference sulfur concentration must be changed to match the particular span of density signals to be measured, the linearizing circuit must be changed to match the measuring range of sulfur concentration, and the division circuit must be changed to match both the measuring range of sulfur concentration and the span of density. These circuits should be modified each time the measuring range is changed. In practice, the range cannot easily be changed. For these reasons it has been difficult to standardize the circuits and reduce the cost of the instrument. For the same reasons, a sulfur concentration meter capable of measurement as a multirange instrument has not been realized.

SUMMARY OF THE INVENTION

A principal object of the present invention is to provide a measuring apparatus for a two-variable function signal system, in which the signal processing circuits can be used in common or standardized for different measurement ranges, and at the same time be operated with high linearity.

Another object of the invention is to provide a measuring apparatus for a two-variable function signal system, in which the measuring range can easily be changed.

Still another object of the invention is to provide a multirange measuring apparatus for a two-variable function signal system.

Briefly, the measuring apparatus of the invention comprises: a linearizing circuit for linearizing the difference between a reference input signal and an input exponential function signal having two independent variables as its exponents; a subtraction circuit for subtracting from the output signal of the linearizing circuit a signal corresponding to the product of the reference value of the desired one of the independent variables and the difference between the reference value of the other independent variable and the other independent variable; and a division circuit with its dividend input being a signal corresponding to the output of the subtraction circuit, and its divisor input being a signal corresponding to the difference between the reference value of the other independent variable and the other independent variable. In the foregoing measurement apparatus according to the invention, the measuring range can easily be changed, the circuits can be used in common or standardized, and a highly linear measuring apparatus can be achieved.

These and other objects, aspects and advantages of the invention will be apparent from the following detailed description of the invention when read in conjunction with the accompanying drawings.

DESCRIPTION OF THE PREFERRED EMBODIMENTS

Figure 1:
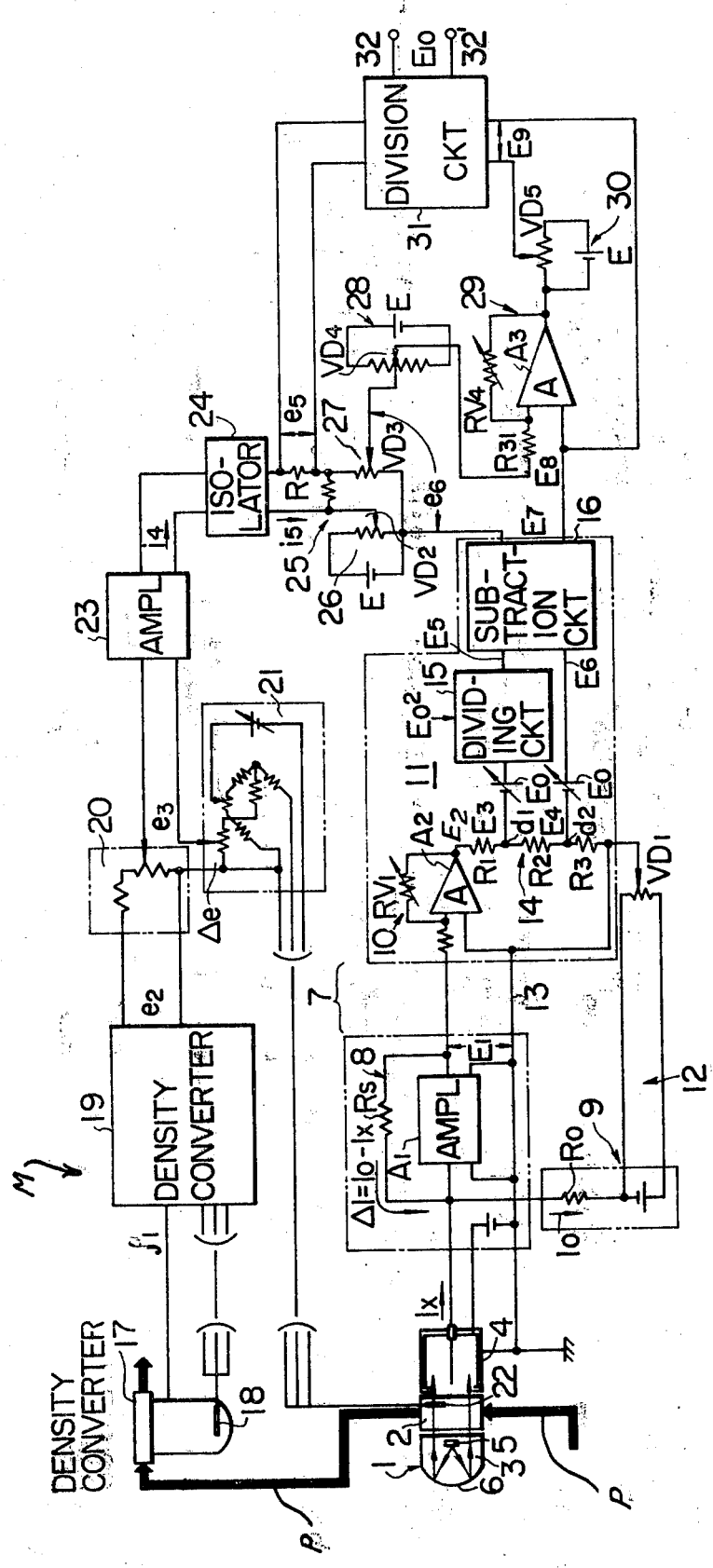
FIG. 1 is a schematic and block diagram showing a measuring apparatus according to the present invention.

Referring to FIG. 1, process petroleum travelling in a path indicated by heavy arrow P has its sulfur concentration measured in a measuring apparatus M arranged in accordance with the present invention. The measuring apparatus M comprises a sulfur concentration detector 1, which includes a sample cell 2 into which the process petroleum is continuously introduced, a radiation source 3 located on one side of the sample cell 2, and an ionization chamber 4 located on the other side thereof. The radiation source 3 comprises a radiation material 5 using, for example, $241_{Am}$, and a target 6 capable of emitting fluorescent X-rays when irradiated with radioactive rays from the radiation material 5. The target 6 is of silver and tin, in an area ratio of 50:50. A sulfur concentration detector of this construction, described in detail in Japanese Patent Application No. 44–80950, 1969, is operable free of the influence of the carbon-to-hydrogen concentration ratio. The output $Ix$ of the detector 1 is given as $$Ix = I'oe^{-\rho t}\{(\mu_S - \mu_{CH})C_S + \mu_{CH}\} \qquad (1)$$

where
- $I'_o$: the output of the detector when the sample cell 5 is empty
- $\rho$: the density of the petroleum
- $t$: the effective length of the sample cell
- $\mu_S$: the mass absorption coefficient of sulfur
- $\mu_{CH}$: the mass absorption coefficient of hydrocarbon
- $C_S$: the concentration of sulfur Measuring apparatus M further comprises a linearizing circuit 7 for linearizing the difference between a reference input signal and an input signal comprising the product of an exponential function signal and the reference input signal. This circuit operates in the manner of the division type logarithmic amplifier described in Japanese Patent Application No. 45-128618, 1970, and in corresponding U.S. Pat. No. 3,710,089. The linearizing circuit 7 comprises a deviation input amplifier 8, a reference input current source 9, a level adjusting circuit 10, and a logarithmic conversion part 11. The deviation input amplifier 8 comprises a current feedback amplifier A1 having a feedback resistor Rs, and receives as its input signal the difference between the output $Ix$ of the sulfur concentration detector 1 and the reference input current Io from the reference input current source 9. The output of deviation input amplifier 8 is a signal E1.

The reference input current Io is set to correspond to a reference sulfur concentration and a reference density by source 9, which comprises a resistor Ro and a variable DC power source 12 connected in series with the resistor Ro. The DC power source 12 has one terminal connected through resistor Ro to the input terminal of amplifier A1, and the other terminal to the variable output terminal or brush of a potentiometer VD1 which is adjusted to provide for the zero or reference adjustment of sulfur concentration. The variable potentiometer terminal is grounded through a common line 13.

The level adjusting circuit 10 is a current feedback type amplifier A2 having a variable resistor RV1 as a feedback resistor and having an output E2. The purpose of the level adjusting circuit 10 is to invert the polarity of the output E1 (= $Rs \cdot I_o x$) of the deviation input amplifier circuit 8 and to adjust it to a given level. For example, if the output E2 of the level adjusting circuit 10 is $-E_o x$, and the gain is A, then $$E2 = -E_o x = -AE1 = -ARsI_o x.$$

The logarithmic conversion part 11 of linearizing circuit 7 comprises a potentiometer circuit 14 having a series circuit of resistors R1, R2 and R3 connected across the output terminals of level adjusting circuit 10, a division circuit 15 with its divisor input being the sum of a reference voltage Eo and a voltage E3 at the first voltage-division terminal $d_1$ at the junction of resistors R1 and R2, and with its dividend input being a signal $Eo^2$ which is the square of the reference voltage Eo. A subtraction circuit 16 subtracts from the output E5 of division circuit 15 the sum voltage E6 of the reference voltage Eo and a voltage E4 at the second voltage-division terminal $d_2$ at the junction of resistors R2 and R3. Resistors R1, R2 and R3 of the potentiometer circuit 14 have the following relationship:

$$R1 = R3; \quad R2 = (1/\lambda)R1 \text{ (where } \lambda \approx 1/\sqrt{2}\text{)}$$

A density detector 17 is disposed on the sample line P which carries petroleum through the sulfur concentration detector 1. For this detector it is desireable to use a vibration type density meter, which is capable of measuring a liquid density with high accuracy by measuring the lateral free vibration of a pipe filled with the sample liquid. A resistance bulb 18 is immersed in the sample solution flowing through the density detector 17 to measure the temperature as the density is measured to permit compensation for density changes arising with change in temperature. Such compensation runs in a density converter 19, in which a density detection signal $\rho 1$ from detector 17 is normalized into a density at a given reference temperature and also converted into an output signal $e_2$ of a given level, for example, a 1 to 5 VDC signal.

The density signal $e_2$ is suitably attenuated by an attenuator 20 and then added to a temperature compensation signal from a temperature compensation circuit 21 arrayed to adjust the density signal to correspond to density at the temperature at which the sulfur concentration is detected in detector 1. The temperature compensation circuit comprises a bridge circuit having in one arm a resistance bulb 22 immersed in the sample liquid in the sample cell 2 of the sulfur concentration detector 1. The bridge output is added to the output of the attenuator 20, and the resultant density signal $e_3$ is amplified by a power amplifier 23 and delivered as an output current signal $i_4$, e.g., of 4 to 20 mA DC, which corresponds to the density of the sample liquid in the sample cell 2 of the sulfur concentration detector 1. An isolator 24 provides an output density signal $i_5$ isolated from the input density signal $i_4$. When an arrangement is made so that the output of the density converter 19 is isolated from the input, the isolator 24 is not needed.

The density signal $i_5$, of 4 to 20 mA DC, being an input-output isolated signal, is supplied to a density compensation circuit 25 and is converted by resistor R to a voltage signal $e_5$ of, e.g., 1 to 5 VDC.

The density compensation circuit 25 generates a density compensation output at a reference sulfur concentration. This circuit comprises a zero adjusting circuit 26 for adjusting the compensation output to zero at a reference density, and a span adjusting circuit 27 for setting the range of values of signal. The zero adjusting circuit 26 comprises a DC power source E and a potentiometer VD2. The span adjusting circuit 27 comprises a potentiometer VD3. The output terminal of the potentiometer VD2, and the resistor of potentiometer VD3, form a series circuit. The variable output terminal of VD2, which is one end of the series circuit, and one terminal of VD3, which is the other end of the series circuit, are connected to the output terminal of the isolator 24. The connection point of VD2 and VD3 is connected to one end of the output terminal of the subtraction circuit 16 of the logarithmic conversion part 11, of linearizing circuit 7, and the variable output terminal of VD3 is connected to one end of the input terminal of a sulfur concentration span adjusting circuit 29 by way of a zero adjusting circuit 28 for calibration to an analyzed value obtained in the test room. This zero adjusting circuit 28 compensates for the error due to vanadium and nickel components contained in the sample liquid, which affect the sulfur concentration.

The sulfur concentration span adjusting circuit 29 is a current feedback type amplifier comprising an amplifier A3, an input resistor R31 for the amplifier A3, and a variable feedback resistor RV4. The amplifier input terminal on the side of the input resistor R. 31 is connected to the variable output terminal of potentiometer VD4 in zero adjusting circuit 28, and the other input terminal is connected to the output terminal of the subtraction circuit 16. Thus this span adjusting circuit 29 adjusts the sulfur concentration signal into a given span such as 0 to 4 VDC.

A bias circuit 30 gives a 1 VDC bias to the 0 to 4 VDC output of the sulfur concentration span adjusting circuit 29, thereby providing a 1 to 5 VDC signal. As shown in FIG. 1, the bias circuit 30 comprises a DC power source E and a potentiometer VD5.

A division circuit 31 removes the density parameter element left in the sulfur concentration signal. In division circuit 31, sulfur concentration signal E9 is its dividend input, and the output $e_5$ of the isolator 24 is its divisor input. The result of the division is a sulfur concentration signal E10 at terminals 32 and 32' which does not contain any density component.

The operation of measuring apparatus M of the invention may be explained as follows. Eq. (1), may be rewritten in simpler form as follows:

$$Ix = I'oe^{-\rho t(aC + b)} \quad (1')$$

Letting $a = \mu_S - \mu_{CH}$, and $b = \mu_{CH}$
Rearranging Eq. (1'), $$Ix = I'oe^{-\rho_o t(aC_{S_0} + b)} \left\{ 1 - \frac{e^{-\rho_o t a C_{S_0} + b)} - e^{-\rho t a C_S + b)}}{e^{-\rho_o t a C_{S_0} + b)}} \right\}$$

where
$C_{S_o}$ : the reference sulfur concentration
$\rho_o$ : the reference density Substituting $I_o$ and $x$, defined as follows, for part of Eq. (1''), $$I'oe^{-\rho_o t a C_{S_0} + b)} \equiv I_o \quad (2)$$

$$\frac{e^{-\rho_o t a C_{S_0} + b)} - e^{-\rho t a C_S + b)}}{e^{-\rho_o t a C_{S_0} + b)}} \equiv x \quad (3)$$

Then Eq. (1') may be rewritten as $$Ix = Io(1 - x) \quad (1''')$$

In the reference input current source 9, the reference input signal Io is provided according to Eq. (2), and this signal is differentially added to the sulfur concentration detection signal Ix, and the sum of these signals is amplified in the deviation input amplifier part 8, whereby the following output is made available from the output terminal of the deviation input amplifier 8.

$$E1 = Rs \cdot I_o x \quad (4)$$

The level of output E1 of the deviation input amplifier 8 is suitably adjusted by the level adjusting circuit 10 and then its polarity is inverted. Then the following output E2 is provided.

$$E2 = -ARs \cdot I_o x = -E_o x \quad (5)$$

where $ARsIo = Eo$ (The signal Eo will hereinafter be referred to as reference voltage signal.)

The output of the level adjusting circuit 10 is applied to the potentiometer circuit 14 of the logarithmic conversion part 11 whereby two voltages E3 and E4 are provided. The signal E3 at the first output point $d_1$ is equal to $-\lambda E_o x$ (i.e., $E3 = -\lambda E_o x$) which is added to the reference voltage signal Eo (i.e., $-\lambda E_o x + Eo$). The summed signal is supplied as a divisor input to the division circuit 15. Since the signal $Eo^2$ (which is the square of the reference voltage signal Eo) has been applied as a dividend input to the division circuit 15, the following output E5 is available from the output terminal of the division circuit 15.

$$E5 = \frac{Eo}{1 - \lambda x} \quad (6)$$

The signal E4 provided at the second output point $d_2$ of the potentiometer 14 is equal to $-(1 - \lambda) \cdot E_o x$, which is added to the reference voltage signal Eo. Thus $$E6 = -(1 - \lambda) E_o x + Eo = -Eo \{-1 + (1 - \lambda)x\} \quad (7)$$

In the subtraction circuit 16, the signal E6 is subtracted from the signal E5.

$$E7 = E5 - E6$$
$$= \frac{Eo}{1 - \lambda x} + Eo \{-1 + (1 - \lambda) x\}$$
$$= Eo \left\{ \frac{1}{1 - \lambda x} - 1 + (1 - \lambda)x \right\} \quad (8)$$

In Eq. (8), the term in the braces is closely approximate to $-\log(1-x)$ when $\lambda \approx 1/\sqrt{2}$, as described in Japanese Patent Application No. 45-12861, 1970, and corresponding U.S. Pat. No. 3,710,089. Therefore Eq. (8) may be rewritten as $$E7 \approx -Eo \log(1 - x) \quad (9)$$

Substituting Eq. (3) for Eq. (9) and rearranging it, $$E7 = Eo\{\rho t (aC_S + b) - \rho_o t(aC_{S_o} + b)\} \quad (10)$$

Modifying Eq. (10), $$E7 = Eo\{\rho t a (C_S - C_{S_o}) + t (aC_{S_o} + b)(\rho - \rho_o)\} \quad (11)$$

The density detection signal P1 from the density detector 17 is converted into a density signal $e_2$, such as a 1 to 5 VDC signal, which is standardized through reference temperature conversion by the use of a temperature signal supplied from the resistance bulb 18. This reference temperature conversion density signal $e_2$ is adjusted to a small level voltage by the attenuator 20. To the adjusted voltage, a compensation signal $\Delta e$ from the temperature compensation circuit 21 is added whereby it is compensated into a density signal $e_3$ at the temperature of the sample cell 2 at which the sulfur concentration is detected. The compensated density signal $e_3$ is power-amplified by the power amplifier 23 and converted into a DC current signal $i_4$, such as a 4 to 20 mADC signal. This density signal $i_4$ is provided with input-output isolation by the isolator 24 and then converted into a 1 to 5 VDC voltage signal through a resistor R. The resultant signal is supplied to the division circuit 31 and to the density compensation circuit 25 at a reference sulfur concentration.

In the density compensation circuit 25, a voltage is produced by the zero compensation circuit 26 which is inverse to the density signal $i_5$ so that the density compensation signal becomes zero at a reference density, for example, at a minimum value of density. In span adjusting circuit 27, a span adjustment is made so that a density compensation signal $e_6$ is provided at a reference sulfur concentration as in Eq. (12) below, equal to the second term $E_o t (aC_{S_o} + b) (\rho - \rho_o)$ of Eq. (11)

$$e_6 = E_o t (aC_{S_o} + b) (\rho - \rho o) \quad (12)$$

This density compensation signal $e_6$ is differentially added to the output of the subtraction circuit 16 at the input terminal of the sulfur concentration span adjusting circuit 29, by way of the calibration zero adjusting circuit 28. As a result, the following Eq. (13) is obtained by subtracting Eq. (12) from Eq. (11).

$E8 = E7 - e_6 = E_o\{pta(C_S - C_{So}) + t(aC_{So} + b)(\rho-\rho_o)\} - E_ot(aC_{So}+b)(\rho-\rho_o) = E_opta(C_S - C_{So})$.

In other words, the signal applied as an input to the sulfur concentration span adjusting circuit 29 is a signal proportional to the product of the sulfur concentration and the density. This sulfur concentration signal is span-adjusted by the sulfur concentration span adjusting circuit 29. Then a bias signal of DC 1 V is added to the span-adjusted signal by the bias circuit 30. The resultant signal is a signal E9 of DC 1 to 5 V, which is supplied as a dividend input to the division circuit 31. Accordingly, the sulfur concentration signal E9 is given as $$E9 = 1 + 4 \frac{\rho(C_S - C_{So})}{\rho_{max}(C_{S_{max}} - C_{So})} \quad (14)$$

where
$\rho_{max}$: the maximum density in the density measuring range
$C_{S_{max}}$: the maximum sulfur concentration in the sulfur concentration measuring range The density signal $e_5$ which is the divisor input to the division circuit 31 is $$e_5 = 1 + 4 \frac{\rho - \rho_{min}}{\rho_{max} - \rho_{min}} \quad (15)$$

where
$\rho_{min}$: the minimum density in the density measuring range

The division circuit 31 is designed to perform a division operation on the sulfur concentration signal E9 and the density signal $e_5$ according to the following equation.

$$E10 = 1 + (E9-1) \frac{\frac{\rho_{max}}{\rho_{min}}}{1 + \frac{e_5 - 1}{4}\left(\frac{\rho_{max}}{\rho_{min}} - 1\right)} \quad (16)$$

Substituting Eqs. (14) and (15) for E9 and $e_5$ of Eq. (16), $$E10 = 1 + 4 \frac{C_S - C_{So}}{C_{S_{max}} - C_{So}} \quad (17)$$

It is apparent from Eq. (17) that a standardized signal of 1 to 5V DC (or 4 to 20 mA DC, 10 to 50 mA DC, or the like) which is proportional only to the sulfur concentration $C_S$ is obtained from the output terminals 32 and 32' of the division circuit 31.

Figure 2:
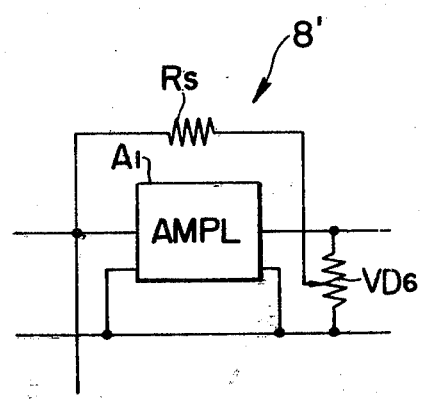
FIGS. 2 and 3 are diagrams showing portions of other measuring apparatuses according to the invention.

In the embodiment of measuring apparatus M described above, the deviation input amplifier 8 comprises an amplifier A1 of constant gain. Instead, as in deviation amplifier 8' shown in FIG. 2, a variable gain amplifier may be formed by connecting a potentiometer VD6 between the output terminals of the amplifier A1, and by leading the variable terminal of potentiometer VD6 to the input terminal of the amplifier A1 through resistor Rs. Thus the output of the deviation input amplifier 8' can be adjusted, and hence the need for the level adjusting circuit 10 is eliminated.

According to the invention, as has been described above, an exponential function signal is linearized by partial logarithmic conversion on the basis of a reference value and, as a consequence, a highly linear output can be obtained even by using an amplifier of narrow dynamic range. Furthermore, if the reference sulfur concentration is changed and/or the reference density is changed beyond the allowable range of density variation or the output of the sulfur concentration detector is changed by a change of the radiation source, etc., that is, if the reference input Io as in Eq. (2) is changed, the output of the logarithmic conversion circuit 11 can be adjusted to the range of a predetermined signal level ($E_ox$) by adjusting the zero adjusting potentiometer VD1 of the reference input power source 9 and also by adjusting the level adjusting potentiometer RV1 of the level adjusting circuit 10 or by adjusting, instead of RV1, the gain of a variable gain type deviation input amplifier 8' (FIG. 2) when such amplifier is used. This makes it possible to standardize the logarithmic conversion circuit.

This adjustment may be made also by adjusting the potentiometer VD3 of the span adjusting circuit 27 of the density compensation circuit 25 at a reference sulfur density. In this case it is not necessary to adjust the linearizing circuit.

According to the invention, because the density compensation signal is taken at a reference sulfur concentration as a signal $e_6$ [$= E_ot(aC_{So} + b)(\rho-\rho_o)$] which is proportional to the product of the reference sulfur concentration and the difference between the density and the reference density, and this signal is subtracted from the sulfur concentration signal E7, the operation factor used when the sulfur concentration signal, after the subtraction, is divided by a density parameter is totally irrelevant to the sulfur concentration as indicated by Eq. (16). As a result, the operation range depends only upon the density measuring range. In addition, because the density measuring range can be determined to be constant, the division circuit 31 can be standardized. Furthermore, when the reference sulfur concentration and reference density are not changed, the sulfur concentration measuring range can be arbitrarily determined only by adjusting the sulfur concentration span adjusting circuit.

For the foregoing reasons, it becomes feasible to standardize the measuring apparatus M when the zero adjusting potentiometer VD1 of the reference input current source 9, the variable resistor RV1 of the level adjusting circuit 10 or the potentiometer VD6 of variable gain type deviation input amplifier 8' (FIG. 2), the span adjusting potentiometer VD3 of the density compensation circuit 25, the variable resistor RV2 of the sulfur concentration span adjusting circuit 29, and the potentiometer VD4 of the zero adjusting circuit 28 for calibration to an analyzed value provided in the test room, are constructed into corresponding range units.

Therefore, a measuring apparatus M of multi-range operation can readily be realized by the use of a plurality of the above units sized according to the expected ranges of sulfur and density and by jointly switching the individual units which are, for example, interlocked.

Figure 3:
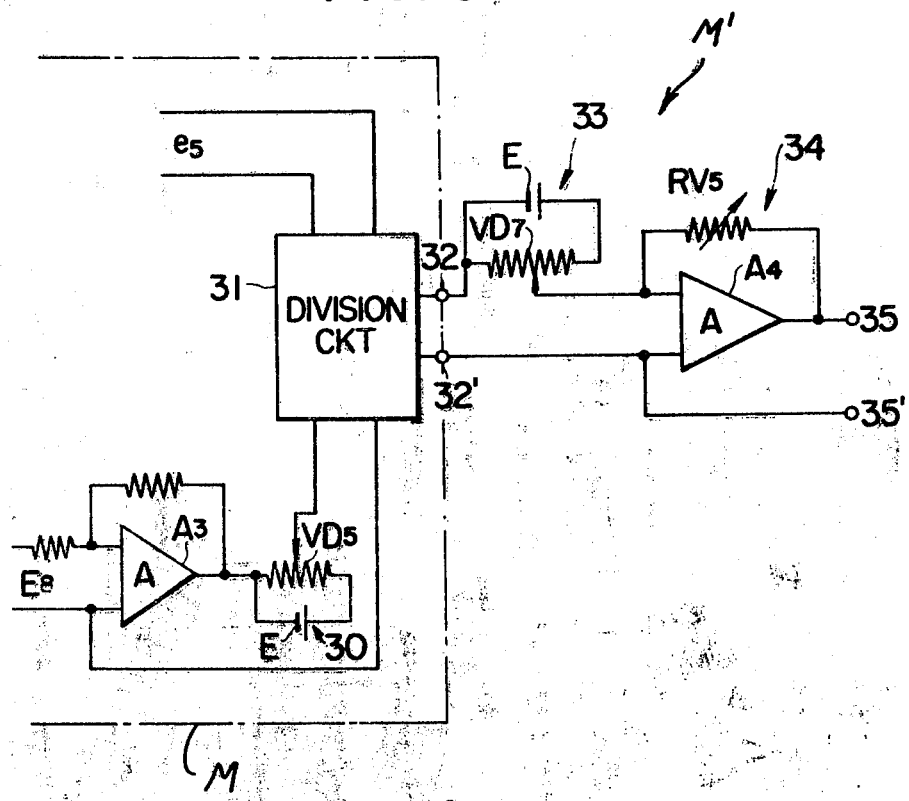

FIG. 3 illustrates another measuring apparatus M' arranged to supply multi-range operation in a two-variable function signal system. In FIG. 3, a zero adjusting circuit 33 comprising a DC power source E and a potentiometer VD7 is connected to the output terminals 32 and 32' of the measuring apparatus M shown in FIG. 1. A sulfur concentration span adjusting circuit 34 comprising an amplifier A4 and its variable feedback resistor RV5 is connected to the output terminals 32 and 32' via the zero adjusting circuit 33. Thus, in the reference input lower source 9 of FIG. 1, when the reference sulfur concentration is set to zero, the minimum value of the sulfur concentration measuring range can be determined by adjusting the potentiometer VD7 of the zero adjusting circuit 33 of FIG. 3. Similarly, the sulfur concentration measuring span (i.e., the maximum value of sulfur concentration) can be determined by adjusting the variable resistor RV5 of the sulfur concentration span adjusting circuit 34. To use such adjustment techniques, however, the operating accuracy of the division circuit must be reasonably high.

In the foregoing embodiments, the invention has been described in connection with an exponential function signal system with two independent variables as its exponents, for the measurement of the concentration of sulfur content in petroleum. In the same sense, the invention has a wide range of application to the measurement in an exponential function siganl system having two independent variables as its exponents wherein one of the independent variables is separated from the other; for example, a small amount of an element such as lead, nickel and vanadium contained in petroleum can be measured by utilizing radioactive rays absorbed in the sample petroleum.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

We claim:

1. A measuring apparatus for a two-variable function signal system comprising: a linearizing circuit for linearizing the difference between a reference input signal and an input exponential function signal having two independent variables as its exponents; a signal compensation circuit for producing a compensation signal corresponding to the product of the reference value of the desired one of the independent variables and the difference between the reference value of the other independent variable and the other independent variable; said signal compensation circuit having an adjusting circuit for adjusting the span of the compensation signal; a subtraction circuit for subtracting the compensation signal from the output of the linearizing circuit; and a division circuit with its dividend input being a signal corresponding to the output of the subtraction circuit, and its divisor input being a signal corresponding to the difference between the reference value of the other independent variable and the other independent variable.

2. A measuring apparatus for a two-variable function signal system as claimed in claim 1 wherein said linearizing circuit comprises: a reference input power source for providing said reference input signal, said reference input power source being a variable output power source; an amplifier for amplifying the difference between said input signal and said reference input signal, said amplifier being a variable gain amplifier; and a logarithmic conversion means for logarithmically converting the output of said amplifier.

3. A measuring apparatus for a two-variable function signal system as claimed in claim 1 wherein said linearizing circuit comprises: a reference input power source for providing said reference input signal, said reference input power source being a variable output power source; an amplifier for amplifying the difference between said input signal and said reference input signal; a level adjusting circuit for adjusting the output signal of the amplifier; and logarithmic conversion means for logarithmically converting the output of said level adjusting circuit.

4. A measuring apparatus for a two-variable function signal system as claimed in claim 1 wherein a signal shifting circuit and a span adjusting circuit are connected to the output of said division circuit.

5. A measuring apparatus for a two-variable function signal system as claimed in claim 1 wherein the signal compensation circuit includes a zero adjusting circuit for adjusting the compensation signal to zero at the reference value of the other independent variable.

6. A measuring apparatus for a two-variable function signal system as claimed in claim 1 further comprising zero adjusting means for calibrating the output signal of the measuring apparatus, said subtraction circuit including means for differentially adding up the output of the zero adjusting means with the compensation signal and the output of the linearizing circuit.

* * * * *

UNITED STATES PATENT OFFICE
CERTIFICATE OF CORRECTION

Patent No. 3,895,221      Dated July 15, 1975

Inventor(s) Shuichi Ohata et al

It is certified that error appears in the above-identified patent and that said Letters Patent are hereby corrected as shown below:

Column 5, line 24 reads:     $Ix = I'oe^{-\rho t(aC + b)}$     (1')

Should read:     $Ix = I'oe^{-\rho t(aC_S + b)}$     (1')

Column 5, line 32     Add --(1")-- in right hand corner

Signed and Sealed this seventh Day of October 1975

[SEAL]

Attest:

RUTH C. MASON
*Attesting Officer*

C. MARSHALL DANN
*Commissioner of Patents and Trademarks*